July 20, 1965 A. C. FRANCOIS 3,196,420
CLOCK WRITER FOR MAGNETIC DATA STORAGE DEVICES
Filed Jan. 29, 1962
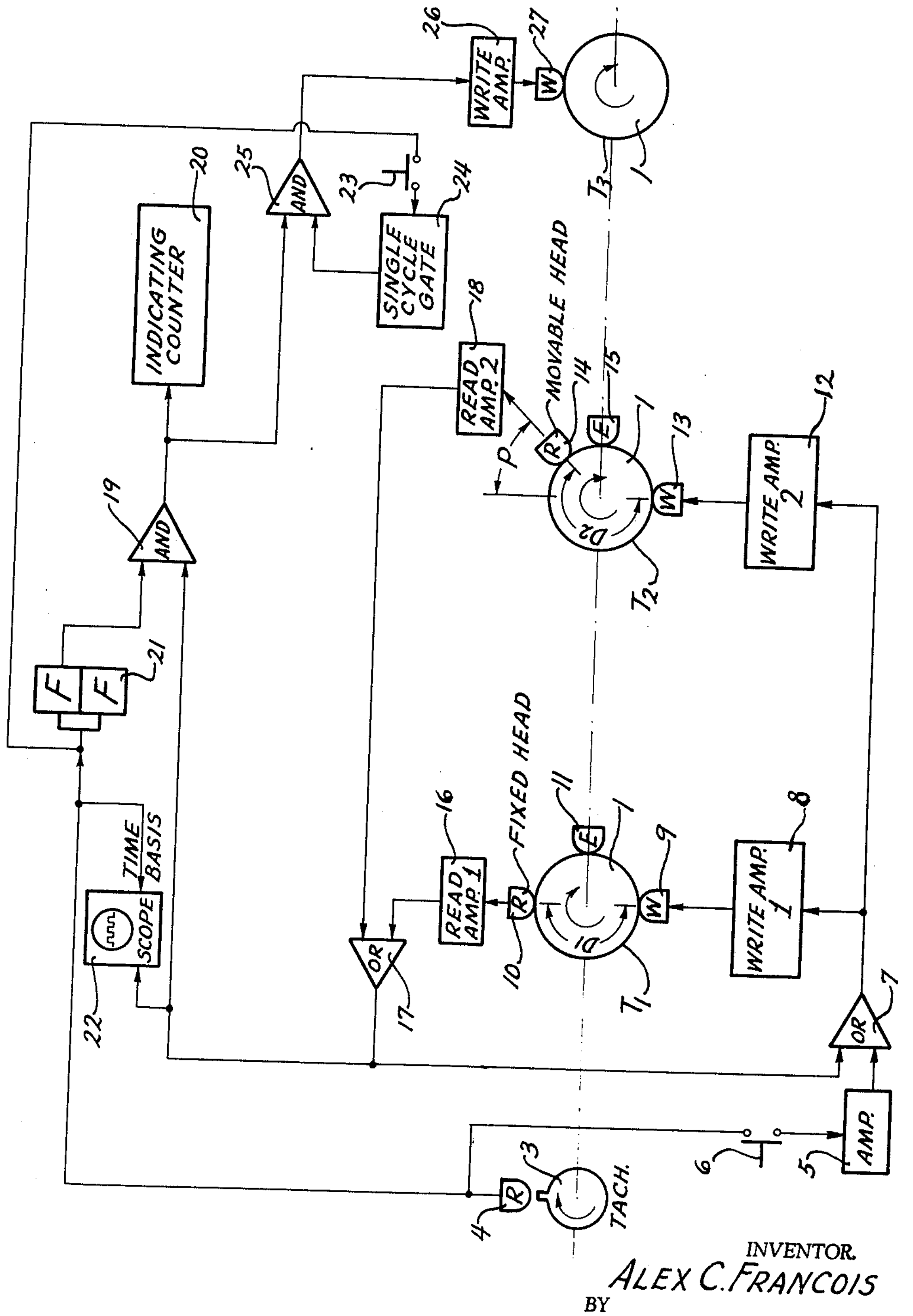
INVENTOR.
ALEX C. FRANCOIS
BY
Bower & Patalidis
ATTORNEYS United States Patent Office 3,196,420
Patented July 20, 1965

3,196,420

CLOCK WRITER FOR MAGNETIC DATA STORAGE DEVICES

Alex C. Francois, Farmington, Mich., assignor to Ex-Cell-O Corporation, Detroit, Mich., a corporation of Michigan Filed Jan. 29, 1962, Ser. No. 169,404
5 Claims. (Cl. 340—174.1)

The present invention relates to clock writer for magnetic storage devices in general and more particularly to means for placing synchronization pulses, sometimes also called timing or sprocket pulses, upon a closed loop clock track on the recording medium of a magnetic disc or drum.

It is well known that data recorded on magnetic data storage apparatus must be recorded and read in synchronization with timing pulses, in order to insure perfect synchronism between the recording on and reading from the record medium and the general operation of the equipment, such as a computer for example, which is associated with the magnetic data storage apparatus. Consequently, at least one clock track is permanently recorded, for the above mentioned purpose, in a closed loop upon the magnetizable surface of the data storage apparatus, be it in the form of a disc or a drum.

The clock track consists of a series of magnetic pulses of a given frequency that must remain accurately constant all around the track and which must form a perfectly closed loop without break or lapse in the continuous train of pulses, with the first pulse of the loop and the last pulse of the loop joined accurately without mismatching of their respective phases in order to provide a loop without beginning nor end. An exact number of pulses must therefore be recorded on a track of a given length and no foolproof method has hitherto been devised to impress upon a closed track on a disc or a drum a perfect synchronization pulse train of a given frequency. It is obvious that if the pulse train is supplied by a pilot generator furnishing even a perfectly stable pulse frequency, means must be provided to insure that the disc or drum is rotating at a constant velocity during at least one revolution while the clock track is being recorded. Furthermore the problem remains of causing the last and first pulses in the loop to merge in a way which is indistinguishable from the way in which all the other pulses are associated. It is also obvious that great difficulties exist where it is desired to record a given number of pulses, each one of which occupy an infinitesimal length on the track, in a circle the length of which cannot be determined with any degree of precision by means known today.

It is evident that the important factor in establishing a synchronization track is to be able to record a given number of pulses in a complete clock track. The actual frequency of the pulse train, in relation to "exact" time, is immaterial as the frequency will vary with variations in the angular velocity of the disc or drum supporting the clock track. However, because the data is being recorded on or read from tracks rotating in unison with the clock track, perfect relative timing and synchronization of the information pulses with the clock pulses will exist at all times due to the data recording or reading operation being effected under the control of the clock pulses.

The present invention teaches a method of recording a clock track on a disc or a drum in a simple manner which nevertheless insures that a perfect track will be recorded at all times.

One object of the invention, therefore, is to provide an improved clock writer for magnetic data storage apparatus of the disc or drum types.

Another object of the invention is to provide means for recording a clock track of a given frequency containing an exact number of timing pulses per revolution of the disc or drum.

Another object of the invention is to effectuate the recording of timing pulses on a clock track in synchronization with the rotation of the disc or drum on which the clock track is being recorded.

A further object of the invention is to provide means for building up a pulse train of a given period into a provisory loop and for manually varying the period preparatory to recording the pulse train into a definitive clock track.

Yet another object of the invention is to utilize the rotation of the disc or drum to generate the pulse train and to trigger the beginning and the end of the recording of the clock track.

Yet a further object of the invention is to generate the pulse train and effectuate the recording of the clock track in perfect synchronization with the rotation of the disc or drum. Other objects and advantages will become apparent from the following description with reference to the accompanying drawing illustrating, in a block diagram form, the principle of a clock writer according to the invention.

A drum or disc 1 is shown arbitrarily as having, inter alia, the three tracks identified by T1, T2 and T3. It is to be understood that T1, T2 and T3 are preferably three concentric tracks on the same face of a magnetic disc or three parallel tracks anywhere on the peripheral surface of a magnetic drum. Alternately, T1, T2, T3 may be situated on separate discs keyed or otherwise fastened, provisorily or permanently on a common spindle for rotation in unison, or on any combination of discs and drums on a common driving spindle. This synchronized rotation of tracks T1, T2 and T3 is schematically represented by the dot and dash line passing through the centers of the circles representing tracks T1, T2 and T3.

On the same shaft, and in synchronized rotation with the support of tracks T1, T2 and T3, is mounted a tachometer 3 supplying a pulse for each revolution of the shaft, which pulse is read by a read head 4.

This pulse is fed to an amplifier 5 when a switch operated by push button 6 is closed. The output from amplifier 5 is fed through an OR gate 7 to a write amplifier, designated by numeral 8, which is in turn connected to write head 9 adapted to record on track T1. A read head 10 is disposed at a fixed angular distance D1 from write head 9. An erase head 11 is positioned after the read head 10.

The output of the OR gate 7 is also connected to another write amplifier, designated by numeral 12, having its output connected to write head 13, adapted to write on the second track T2. A read head 14, adapted to read track T2, is angularly positioned at distance D2 from the write head 13. Erase head 15 is mounted a short distance beyond the read head 14. The read head 14 is movable along track T2, and its angular position D2 relatively to its corresponding write head 13 is larger or smaller than D1, the angular position of read head 10 relatively to the write head 9 on track T1. D2 is here larger than D1, but it is to be understood that the operation of the invention would be identical in the event that D2 had been arbitrarily chosen as smaller than D1, as the all important factor is that D2 and D1 be not equal.

By depressing push button 6, a single tachometer pulse is recorded simultaneously on both tracks T1 and T2. The clockwise rotation of the disc or drum, as indicated by the arrows, brings the pulse recorded on track T1 under the read head 10 before the pulse recorded on track T2 arrives under the read head 14. The spacing between the two pulses is *D2–D1*. The first pulse is read by read head 10 and, after being amplified by read amplifier 16, is fed through the OR gates 17 and 7 to the write amplifiers 8 and 12. That first pulse is re-recorded simultaneously on tracks T1 and T2 by means of the write heads 9 and 13 respectively. A short time later, the pulse read by read head 14 is also re-recorded simultaneously on tracks T1 and T2 by means of the write heads 9 and 13 respectively. Two pulses on tracks T1 and T2 are now proceeding towards their respective read heads, and the precedently recorded pulses are being erased by passing under the erase heads 11 and 15. The first of the new pulses on track T1 is read by the read head 10 and re-recorded simultaneously on both the tracks T1 and T2 as explained hereinbefore. The second pulse is then read by the read head 10, and consequently recorded on the two tracks at the same time as the first pulse on track T2 is read by the read head 14, resulting in only one pulse being re-recorded simultaneously on both tracks. Shortly thereafter the second pulse on track T2 is read by read head 14 and is also re-recorded simultaneously on both tracks. Both tracks have now three re-recorded pulses. The previously recorded pulses are continuously erased on both tracks during their passing under the erase heads, in order to clear the tracks preparatorily to re-recording of the pulses.

This action continues for each revolution of the disc or drum with an addition of one pulse per revolution until a complete pulse train is built in each of the loops of tracks T1 and T2 represented by the segments of said tracks comprised between write head 9 and read head 10, and between write head 13 and read head 14 respectively. The pulse trains are continuously regenerated by being continuously re-recorded on the tracks, and the period of the pulses is $P=D2-D1$. Their fundamental frequency is proportional to the disc or drum rotational speed. The total number of pulses in each loop is equal to $$\frac{D1}{D2-D1}$$

The pulses are also fed through the OR gate 17 and an AND gate 19 to a counter 20, which may be a binary counter capable of giving a visual indication of the number of pulses counted in a certain period of time. The AND gate 19 is controlled by the tachometer pulse and a flip-flop 21, in order to cause the counter 20 to count the number of pulses recirculating continuously in the loops of tracks T1 and T2 between two consecutive pulses from the tachometer 3. This number is the number of pulses available for recording on the clock track. An oscilloscope 22, having its time basis synchronized by the tachometer pulses, may be used, if so desired, to observe the pulse train. The movable read head 14 is adjusted until the number of pulses which is desired to be recorded on the clock track shows constantly on the counter and until the representation of the pulse train on the scope stops drifting. Push button 23 is then depressed to trigger a single cycle gate 24 which in turn enables an AND gate 25, and the pulse train is recorded on the clock track T3 of the disc or drum by means of write amplifier 26 and write head 27. The next tachometer pulse fed to the single cycle gate 24 causes it to disable the AND gate 25 as soon as the disc or drum has accomplished one revolution. A clock or sprocket track has now been recorded on the disc or drum at the desired frequency and in perfect synchronization with the revolution of the disc or drum, resulting in a complete continuous closed loop of pulses being recorded on the clock track. Variations in the revolution velocity of the record medium have no influence on the quality of the clock track as it can be seen that the pulses are being generated, regenerated, recirculated and recorded on the clock track T3 in perfect synchronism with the rotation of the record medium.

Assuming that it is desired for example to record a clock track at a nominal frequency of 150 kilocycles for a rotation velocity of the disc or drum of 900 r.p.m., simultaneous pulse trains are built up in track T1 and T2 as hereinbefore explained. The period of the pulses is $P=D2-D1$ and the number of pulses available for recording on clock track T3 during one revolution of the disc or drum is indicated by the counter 20. The movable head 14 is adjusted until the counter indicates that exactly 10,000 pulses per revolution of the disc or drum are available for recording on the clock track. The push-button 23 is then depressed to initiate the recording on track T3, as explained hereinbefore, and 10,000 pulses are recorded on clock track T3, forming a complete closed loop thereon.

The nominal velocity of the disc or drum being 900 r.p.m. or 15 revolutions per second, the nominal frequency of the pulses on the clock track is $10,000\times 15$ or 150,000 cycles per second.

It is obvious that anyone skilled in the art possesses sufficient knowledge enabling him to construct or purchase the commercially available components indicated in the accompanying block diagram and referred to in this specification as "write amplifier," "read amplifier," OR and AND gates, etc., and those components which, per se, are well known in the art are not herein illustrated nor described in detail, for the sake of simplifying the description of the invention.

It is to be understood that the above-described arrangement is only illustrative of the present invention and that numerous other variations and arrangements may be devised by those skilled in the art without departing from the spirit and scope of the invention.

What is claimed as new is:

1. Apparatus for generating and recording synchronization pulses on the clock track of a rotatable record medium forming part of a magnetic data storage device, said apparatus comprising:

means generating one pulse per revolution of said record medium;

recording means recording one such pulse simultaneously on a first and a second track adapted for concomitant rotation with said record medium;

first means reading said pulse from said first track for re-recording of said pulse by said recording means as a first pulse simultaneously on said first and second tracks;

second means reading said pulse from said second track for re-recording of said pulse by said recording means as a second pulse simultaneously on said first and second tracks, the period between said first and second pulse being proportional to the angular distance between said first and second means;

said recording means re-recording the pulses read by said first and second means, adding one more pulse on both first and second tracks for each revolution of said record medium until complete pulse trains are continuously recirculating in the loops of said first and second tracks;

separate means positioned respectively after said first and second means for erasing pulses from said first and second tracks preparatorily to re-recording said pulses;

means triggered by each revolution of said record medium for counting and displaying pulses available for each said revolution;

means manually adjusting the period of said pulses until the means counting said pulses display a constant and predetermined number of said pulses;

and controllable means for recording said pulses on the clock track on said record medium, the beginning and the end of the recording cycle being timed between a first and a second pulse generated by said first mentioned means.

2. The apparatus of claim 1 wherein the means generating one pulse per revolution of said record medium is a tachometer in synchronized rotation with said record medium.

3. The apparatus of claim 2 wherein said first and second tracks are on a separate record medium provisorily mounted on a common shaft with said record medium for simultaneous rotation therewith.

4. Apparatus for generating and recording synchronization pulses on a track of a rotatable record medium, said apparatus comprising:

means generating one pulse per revolution of said record medium;

means utilizing one such pulse for building up a continuously regenerative closed loop of equally spaced pulses;

means manually adjusting the period of the pulses in said loop;

means counting and displaying the number of pulses available within one revolution of said record medium;

and controllable means triggered during one revolution of said record medium for transferring a continous train of pulses from said closed loop to a track on said record medium.

5. The apparatus of claim 4 wherein the means utilizing one of the pulses available at each revolution of the record medium for building up a continuously regenerative closed loop of equally spaced pulses comprises:

separate recording means recording said pulse simultaneously on two separate tracks;

reading means on one track at an angular distance D1 from its corresponding recording means for reading said pulse and re-recording said pulse simultaneously on both tracks via said recording means;

reading means on the other track at an angular distance D2 from its corresponding recording means for reading said pulse and re-recording said pulse simultaneously on both tracks;

thereby causing two pulses separated by an angular distance $D2-D1$ to be recorded on both tracks after one revolution of said record medium;

and causing $n$ pulses to be recorded on both tracks after $n$ revolutions of said record medium;

whereby said $n$ pulses form a continuously recirculating loop between said reading and recording means on both tracks.

References Cited by the Examiner

UNITED STATES PATENTS

| | | | |
|---|---|---|---|
| 2,801,407 | 7/57 | Lubkin | 340—174.1 |
| 2,832,064 | 4/58 | Lubkin | 340—174.1 |
| 2,903,677 | 9/59 | Curtis | 340—174.1 |
| 2,926,341 | 2/60 | Scarbrough | 340—174.1 |
| 3,041,585 | 6/62 | Wolfe | 340—174.1 |

IRVING L. SRAGOW, *Primary Examiner.*